Dec. 8, 1964  B. W. TAYLOR  3,160,056
KALEIDOSCOPES
Filed April 10, 1961

INVENTOR.
BEVERLY W. TAYLOR
BY
Alfred W. Petchaft
ATTORNEY

United States Patent Office

3,160,056
Patented Dec. 8, 1964

3,160,056
KALEIDOSCOPES
Beverly W. Taylor, 1820 St. Catherine, Florissant, Mo.
Filed Apr. 10, 1961, Ser. No. 101,864
9 Claims. (Cl. 88—15)

This invention relates in general to certain new and useful improvements in kaleidoscopes and, more particularly, to improved optics in such kaleidoscopes.

In the past, there have been certain kaleidoscopes manufactured utilizing a mirror, an objective lens, and an eye lens mounted within a tubular container. However, a serious problem of optics has always presented itself in the manufacture of all types of conventional kaleidoscopes. An object located at any distance from the mirror ordinarily does not appear as a true image on the mirror. Moreover, when objective lenses are employed in an effort to minimize or eliminate image-distortion, only a small area of the lens can be utilized with resultant optical inefficiency.

It is, therefore, the primary object of the present invention to provide a kaleidoscope having a mirror and objective lens wherein substantially the full capacity of the objective lens can be utilized.

It is another object of the present invention to provide a kaleidoscope of the type stated in which a relatively small mirror can be utilized for reproducing a comparatively large, true and undistorted image.

It is also an object of the present invention to provide a kaleidoscope of the type stated which is capable of producing an image having a true kaleidoscope pattern.

It is an additional object of the present invention to provide a kaleidoscope of the type stated which will have a relatively large resolving power.

It is a further object of the present invention to provide a kaleidoscope of the type stated which is rigid and sturdy in construction and economical in cost.

With the above and other objects in view, my invention resides in the novel features of form, construction, arrangement, and combination of parts presently described and pointed out in the claims.

In the accompanying drawing (one sheet)—

Figure 1:
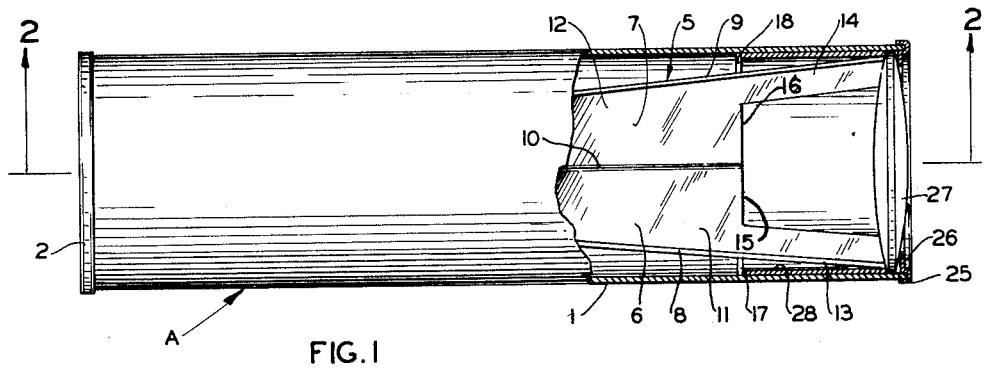
FIG. 1 is a top plan view, partly broken away and in section, of a kaleidoscope constructed in accordance with and embodying the present invention.
Figure 2:
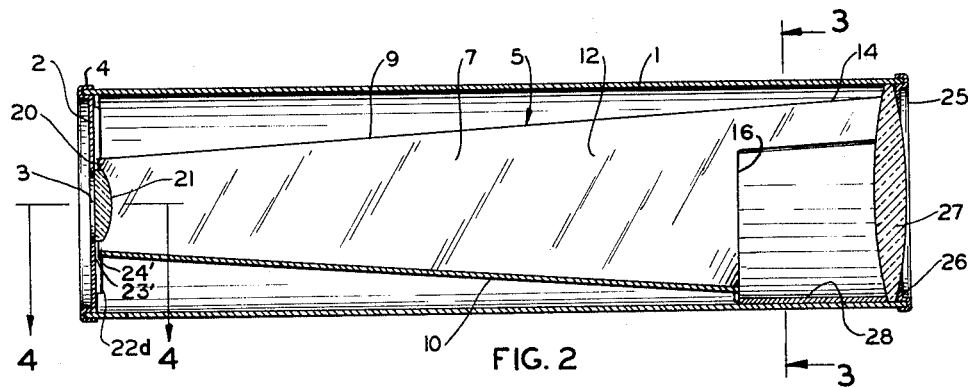
FIG. 2 is a sectional view taken along line 2—2 of FIG. 1.
Figures 3, 4:
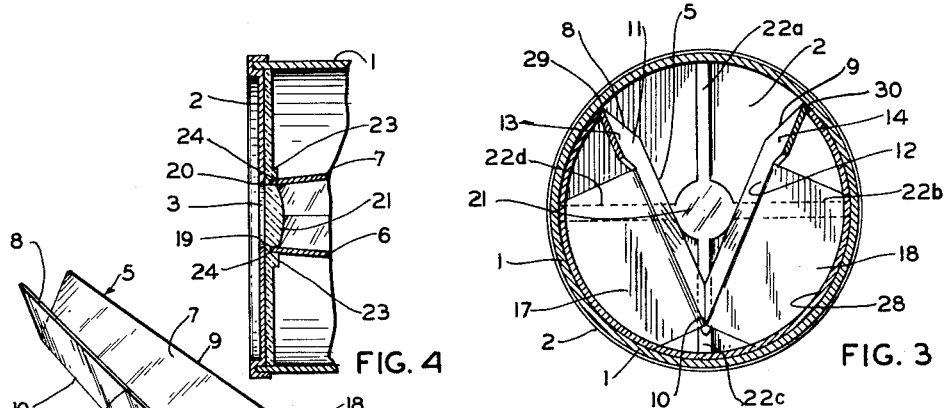
Figure 5:
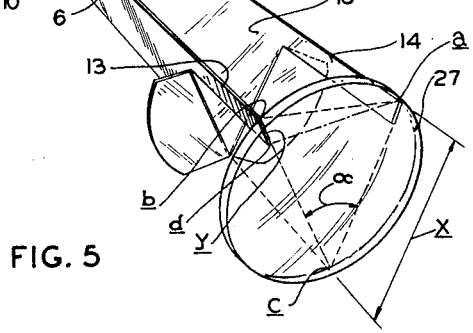

FIGS. 3 and 4 are fragmentary sectional views taken along lines 3—3 and 4—4, respectively, of FIG. 2; and FIG. 5 is a diagrammatic view of the optical system of the kaleidoscope.

Referring now in more detail and by reference characters to the drawing, which illustrates a preferred embodiment of the present invention, A designates a kaleidoscope comprising an elongated tubular shell or housing 1 constructed of cardboard, metal, or synthetic resin. The housing 1 is provided at its rearward end with a metal closure plate 2 having a central aperture 3 and being integrally provided with an annularly extending peripheral retainer ring 4 crimped over the edge of the tubular housing 1.

Disposed within the tubular housing 1 is a lengthwise extending V-shaped compound mirror 5 having a length substantially equal to the interior length of the housing 1 and including two upwardly extending diverging plane reflectors 6, 7, which terminate at upwardly presented straight edges 8, 9, and are joined together in a linear apex 10 which is rearwardly convergent in relation to the edges 8, 9. The reflectors 6, 7, are provided with inwardly presented faces 11, 12, which are polished and adapted to reflect an image. At their forward ends, the reflectors 6, 7, are cut away from the linear apex 10 upwardly for more than half of the distance to the edges 8, 9, to form two lengthwise extending arms 13, 14, which are co-planar with the main body of the reflectors 6, 7, and adjoin forwardly presented intermediate converging edges 15, 16.

Integrally formed on the intermediate edges 15, 16, of the reflectors 6, 7, respectively, are outwardly extending support flanges 17, 18, which are perpendicular to the reflectors 6, 7, and are marginally shaped to fit within the tubular housing 1. At their rearward ends, the reflectors 6, 7, terminate in transverse edges 19, 20.

Fitted within the tubular housing 1 across the central aperture 3 of the closure plate 2 is an ocular or viewing lens 21 preferably constructed of transparent plastic or optical glass, as may be desired, and integrally including four equally spaced radially extending arms 22a, 22b, 22c, 22d, of such length as to fit snugly within the tubular housing 1. Each of the arms 22b, 22d is integrally provided with a clamp boss 23 having an elongated slot 24 sized for tight-fitting engagement around the rearwardly presented edges 19, 20, of the mirror 5. The arm 22c is integrally provided with a clamp boss 23' having a V-shaped slot 24' also sized for tight-fitting engagement around the rearwardly presented edges 19, 20, of the mirror 5.

Crimped or otherwise rigidly secured to the forward end of the tubular housing 1 is an annularly extending ring 25 having an inwardly extending annular flange 26 for retaining an objective lens 27 having an outside diametral size equal to the inside diametral size of the tubular housing 1. The forwardly presented transverse edges of the elongated arms 13, 14, are adjacent to and abut directly against the inwardly presented face of the objective lens 27.

Disposed within the forward end of the tubular housing 1 is a C-shaped sleeve 28 which is of such arcuate size as to seat snugly against the interior face of the housing 1 and is provided with spaced longitudinal edges 29, 30, forming a gap approximately equal to the transverse dimension across the wide or divergent portion of the mirror 5, so that, when seated within the housing 1, the spaced edges 29, 30, of the sleeve 28 will abut retentively against the back or non-reflective surfaces of the arms 13, 14. Furthermore, the C-shaped sleeve 28 extends axially between the rearwardly presented face of the objective lens 27 and the forwardly presented faces of the support flanges 17, 18, thereby maintaining the mirror 5 and objective lens 27 in a fixed position within the tubular housing 1. In this connection, it should be noted that the length of the C-shaped sleeve 28 is substantially equal to the length of the reflector arms 13, 14, which is, in turn, substantially equal to the focal length of the objective lens 27, so that, when the mirror 5 and the objective lens 27 are assembled in said fixed position within the housing 1, the focal plane of the objective lens 27 will be substantially coincident with the plane of the intermediate edges 15, 16, of the reflectors 6, 7.

The reflector arms 13, 14, are of substantially uniform width throughout their length and this width bears a mathematical relationship to the optical system of the kaleidoscope A. This relationship may best be illustrated by reference to FIG. 5, in which the optical elements are shown diagrammatically and in which the points $a$, $b$, represent the points of intersection between the upper marginal edges 8, 9, of the mirror 5 as projected into the diametral center-plane of the objective lens 27. Similarly, the point $c$ is the point of intersection between the linear apex 10 of the mirror 5 and the diametral center-plane of the objective lens 27. The point $d$ is located along the line $bc$ at a distance $y$ from the point $b$ such that the line

*ad* is perpendicular to the line *bc* and has a length *z*. Assuming that the height of the reflectors 6, 7, may be referred to as the distance *x* and the angle between the reflectors 6, 7, may be referred to as the angle α, these elements are mathematically related by either of the following formulas, both of which are equivalent:

$$y = \frac{x \sin \alpha}{\tan\frac{(180° - \alpha)}{1}}$$

or $$y = z \tan\frac{\alpha}{2}$$

As has been above indicated, the width of the reflector arms 13, 14, must be substantially equal to, or slightly less than, the distance *y* according to the above the equation, and, under such circumstances, the reflector arms 13, 14, will reflect substantially all of the more or less axially directed rays passing through the upper portions of the objective lens 27, so that the kaleidoscopic image transmitted by the objective lens will be substantially equal to the area enclosed by the lines *ac*, *bd*, and the segmental arc extending between the points *a*, *b*, without the inclusion of any distortions or aberrated images resulting from reflections of the upper inside faces of the housing 1 in the area between the objective lens and the focal plane thereof.

In use, the kaleidoscope A is held in a more or less horizontal position by the user with the ocular or viewing lens 21 in close proximity to the eye and the objective lens 27 is directed toward the object to be viewed. As a matter of fact, this is more or less the conventional manner in which all kaleidoscopes of this type are used, but the optical result achieved by the kaleidoscope A of the present invention is quite different from that which is normally achieved by conventional kaleidoscopes. In the first place, the objective lens 27 is optically effective over the entire area subtended between the reflective surfaces of the reflectors 6, 7. Since the forward portions of the reflectors 6, 7, are cut away in the provision of relatively narrow reflector arms 13, 14, the objective lens 27 will form an image approximately in the plane of the forward edges 15, 16, of the reflectors 6, 7, which image is a true and undistorted kaleidoscope image, that is to say, a V-shaped segment of the object being viewed and, of course, as is characteristic of all kaleidoscopes, this V-shaped segment will be repeated a number of times by reflection in the reflectors 6, 7, depending upon the acute angle between the reflectors 6, 7. For instance, if this angle is 45°, i.e. ⅛ of a full circle, the image projected to the eye through the ocular or viewing lens 21 will have the appearance of a full circle containing eight contiguous repetitive segments which are identical with the single V-shaped kaleidoscope image projected into the mirror-system by the objective lens 27. As a result, maximum optical efficiency is obtained from the objective lens 27 both as to size of image and resolving power.

It should be understood that changes and modifications in the form, construction, arrangement, and combination of the several parts of the kaleidoscope may be made and substituted for those herein shown and described without departing from the nature and principle of my invention.

Having thus described my invention, what I claim and desire to secure by Letters Patent is:

1. A kaleidoscope comprising an elongated hollow shell, a viewing lens rigidly mounted at the rear end of the shell, an objective lens rigidly mounted at the forward end of the shell, a mirror extending lengthwise between said viewing lens and said objective lens, said mirror having a V-shaped rear portion terminating in rearwardly presented margins that abut said viewing lens, and forwardly presented margins that lie in the focal plane of said objective lens, and a pair of forwardly extending reflector elements integrally formed on the forwardly presented margins, said reflector elements being narrower than said rear portion.

2. A kaleidoscope comprising an elongated hollow shell provided at one end with an end wall structure having a viewing aperture, a viewing lens in said aperture, said shell being provided at its other end with an objective lens, and a mirror disposed lengthwise in said hollow shell and being of such a length so as to abut the end wall structure and the objective lens, said mirror having a portion of its reflective surface removed from the focal plane of the objective lens to the objective lens.

3. A kaleidoscope comprising a single elongated hollow shell provided at its rear end with an end wall structure having a viewing aperture, a viewing lens rigidly mounted at its rear end in said aperture, an objective lens rigidly mounted at its forward end, said viewing lens being provided with a plurality of radially extending arms, and a mirror disposed lengthwise in said hollow shell and being of such a length as to abut said viewing lens and objective lens, said mirror including a V-shaped rear portion which is shorter than the length of the shell and reflective elements which are narrower than the rear portion and which are integrally formed on said rear portion, said reflective elements extending from the focal plane of the objective lens to the objective lens.

4. A kaleidoscope comprising a single elongated hollow shell provided at its rear end with an end wall structure having a viewing aperture and viewing lens in said aperture, an objective lens rigidly mounted at the forward end of the shell, said viewing lens being provided with a plurality of radially extending arms, and a lengthwise extending mirror of such a length as to about said viewing lens and objective lens, said mirror including a V-shaped rear portion which is shorter than the length of the shell and reflective elements which are narrower than the width of the rear portion and which are integrally formed on said rear portion, said reflective elements extending from the focal plane of the objective lens to the objective lens.

5. A kaleidoscope comprising a single elongated hollow shell provided at its rear end with an end wall structure having a viewing aperture, a viewing lens rigidly mounted at the rear end of the shell in such aperture, said viewing lens being provided with a plurality of radially extending arms, an objective lens rigidly mounted at the forward end of the shell, and a V-shaped mirror disposed lengthwise in said hollow shell and being of such a length as to about said viewing lens atnd said objective lens, said mirror including a rear portion having inwardly presented reflecting surfaces which are shorter than the length of the shell and reflector elements which are narrower than the width of the rear portion and which are integrally formed on said rear portion, said reflector elements extending from the focal plane of the objective lens to the objective lens.

6. A kaleidoscope comprising a single elongated hollow shell provided at its rearward end with an end wall structure having a viewing aperture, a viewing lens rigidly mounted at the rear end of the shell in said viewing aperture, said viewing lens being provided with a plurality of radially extending arms, an objective lens rigidly mounted at the forward end of the shell, and a V-shaped mirror having upwardly and outwardly extending reflector plates forming a marginal apex, said V-shaped mirror being disposed lengthwise in said hollow shell and being of such a length as to abut said viewing lens and said objective lens, said mirror including a rear portion which is shorter than the length of the shell and reflector elements which are narrower than the width of the rear portion and which are integrally formed on said rear portion, said reflector elements extending from the focal plane of the objective lens to the objective lens.

7. A kaleidoscope comprising a single elongated hollow shell provided at its rear end with an end wall structure having a viewing aperture, a viewing lens rigidly mounted at the rear end of said shell in said aperture, an objective lens rigidly mounted at the forward end of said shell, a mirror extending lengthwise between said viewing lens and said objective lens, said mirror having a V-shaped rear portion which is formed by upwardly and outwardly extending reflector plates terminating in upwardly presented margins and coming substantially together at their lower margins to form a longitudinally extending apex-line, said rear portion also terminating in rearwardly presented margins that abut said viewing lens and forwardly presented margins that lie in the focal plane of said objective lens, and a forwardly extending reflector element having an inwardly facing reflector surface integrally formed on the forwardly presented margin of the rear portion adjacent the upwardly presented margin, said reflector elements being substantially narrower than said reflector plates and abutting the objective lens.

8. A kaleidoscope comprising a single elongated hollow shell provided at its rear end with an end wall structure having a viewing aperture, a viewing lens rigidly mounted at the rear end of said shell in said aperture, an objective lens rigidly mounted at the forward end of said shell, a mirror interposed between said viewing lens and said objective lens, said mirror having a V-shaped rear portion which is formed by upwardly and outwardly extending reflector plates having outwardly presented longitudinal margins and inner margins that form a line of intersection which converges rearwardly in relation to the longitudinal margins, said rear portion also having rearwardly presented margins that abut said viewing lens and forwardly presented margins that lie in the focal plane of said objective lens, and a forwardly extending reflector arm having an inwardly facing reflector surface integrally formed on the forwardly presented margin of the rear portion adjacent the upwardly presented margin, said reflector arms being substantially narrower than said reflector plates and having a mathematical relationship to the angle formed by said reflector plates at the marginal apex and the segmental arc extending between the upwardly presented margins of said plates.

9. A kaleidoscope comprising a single elongated hollow shell provided at its rear end with an end wall structure having a viewing aperture and viewing lens in said aperture, an objective lens at its forward end, and a mirror disposed lengthwise in said hollow shell and being of such a length so as to abut the end wall structure and the objective lens, said mirror including a V-shaped rear portion which is shorter than the shell and which has forwardly presented margins that lie in the focal plane of said objective lens, said V-shaped rear portion integrally provided along it forwardly presented margins with lengthwise projecting reflector arms having a transverse width according to the following equation $$y = \frac{x \sin \alpha}{\tan\frac{(180° - \alpha)}{2}}$$

wherein $y$ is the transverse dimension of the reflector arm, $x$ is the transverse dimension of the reflector plate and $\alpha$ is the included angle between the reflector plates.

References Cited in the file of this patent

UNITED STATES PATENTS

| | | |
|---|---|---|
| 132,978 | Pool | Nov. 12, 1872 |
| 314,586 | Leach | Mar. 31, 1885 |
| 2,452,363 | Flotron | Oct. 26, 1948 |
| 3,066,571 | Shaffer | Dec. 4 1962 |